United States Patent [19]

Hall

[11] Patent Number: 5,499,243
[45] Date of Patent: Mar. 12, 1996

[54] METHOD AND APPARATUS FOR COORDINATING TRANSFER OF INFORMATION BETWEEN A BASE STATION AND A PLURALITY OF RADIOS

[76] Inventor: Dennis R. Hall, 750 Gonzales Dr., Apt. 3B, San Francisco, Calif. 94132

[21] Appl. No.: 7,586

[22] Filed: Jan. 22, 1993

[51] Int. Cl.$^6$ .................................................... H04L 12/44
[52] U.S. Cl. ...................... 370/85.8; 370/95.2; 370/85.6; 340/825.08
[58] Field of Search .................................. 370/85.1–85.3, 370/95.1–95.3, 104.1, 85.6, 85.7, 85.8; 340/825.07–825.08, 825.54, 825.5; 455/33.1, 33.4, 58, 54.1; 379/60

[56] References Cited

U.S. PATENT DOCUMENTS 4,340,961  7/1982  Capel et al. ............................ 370/85.8

(List continued on next page.)

FOREIGN PATENT DOCUMENTS 2069799  8/1981  United Kingdom .
2165127  4/1986  United Kingdom .

OTHER PUBLICATIONS

Norman Abramson, "The Aloha System", Computer Communication Networks, Prentice–Hall, 1973, pp. 501–517.
Norman Abramson, "The ALOHA System—Another alternative for computer communications", Fall Joint Computer Conference, 1970, pp. 281–284.
R. Binder, et al., "ALOHA packet broadcasting—A retrospect", National Computer Conference, 1975, pp. 203–215.
Aydano B. Carleial, et al. "Bistable Behavior of ALOHA-Type Systems", IEEE Transactions on Communications, vol. COM–23, No. 4, APr. 1975, pp. 401–410.
W. Crowther et al., "A System for Broadcast Communication: Reservation–Aloha", Proceeding of the Sixth Hawaii International Conference in System Science, 1973, pp. 371–374.
Leonard Kleinrock et al., "Packet-switching in a slotted satellite channel", National Computer Conference, 1973, pp. 703–710.
Michael J. Ferguson, "On the Control, Stability, and Waiting time in a Slotted ALOHA Random Access System", IEEE Transaction On Communications, Nov. 1975, pp. 1306–1311.
Simon S. Lam et al., "Packet Switching in a Multiaccess Broadcast Channel: Dynamic Control Procedures", IEEE Transactions on Communications, Sep. 1975, pp. 891–900.
John J. Metzner, "On Improving Utilization in ALOHA Networks", IEEE Transactions on Communications, Apr. 1976, pp. 447–448.
Lawrence G. Roberts, "Dynamic allocation of satellite capacity through packet reservation", National Computer Conference, 1973, pp. 711–716.
Lawrence G. Roberts, "Extensions of packet communication technology to a hand held personal terminal", Spring Joint Computer Conference, 1972, pp. 295–298.

*Primary Examiner*—Douglas W. Olms
*Assistant Examiner*—Chau T. Nguyen
*Attorney, Agent, or Firm*—Rogers & Killeen

[57] ABSTRACT

To efficiently coordinate the transmission of information from a plurality of radios to a base station on the forward channel of an RF channel, transmission time on the forward channel is scheduled by the base. To be allowed to transmit information on the forward channel, a radio first sends a request frame to the base to request permission to access the forward channel. After sending the request frame, the radio waits for the base to assign it a reserved information time slot. Only if an information time slot is reserved, and only during that reserved time slot, may the radio send an information frame on the forward channel. In determining whether to reserve an information time slot for the radio, the base station takes into consideration the priority of the radio. This allows the base station to better coordinate signal activity on the forward channel. Since transmission time on the forward channel is scheduled, conflicting transmissions are minimized. Thus, forward channel capacity is used more efficiently.

24 Claims, 10 Drawing Sheets

U.S. PATENT DOCUMENTS

| | | | |
|---|---|---|---|
| 4,385,382 | 5/1983 | Goss et al. | 370/85.8 |
| 4,398,289 | 8/1983 | Schoute | 370/95.2 |
| 4,612,637 | 9/1986 | Davis et al. | 370/95.2 |
| 4,701,909 | 10/1987 | Kavehrad et al. | 370/85.3 |
| 4,742,512 | 5/1988 | Akashi et al. | 370/95.3 |
| 4,789,983 | 12/1988 | Acampora et al. | 370/84 |
| 4,809,268 | 2/1989 | Tejima et al. | 370/95.2 |
| 4,907,224 | 3/1990 | Scoles et al. | 370/85.2 |
| 4,940,974 | 7/1990 | Sojka | 340/825.08 |
| 4,947,451 | 8/1990 | Nawata | 370/95.1 |
| 5,008,883 | 4/1991 | Eizenhöfer et al. | 370/95.1 |
| 5,150,114 | 9/1992 | Johansson | 340/825.08 |
| 5,160,923 | 11/1992 | Sugawara et al. | 370/85.6 |
| 5,166,675 | 11/1992 | Amemiya et al. | 370/85.8 |
| 5,172,375 | 12/1992 | Kou | 370/95.3 |
| 5,175,870 | 12/1992 | Mabey et al. | 370/95.3 |

METHOD AND APPARATUS FOR COORDINATING TRANSFER OF INFORMATION BETWEEN A BASE STATION AND A PLURALITY OF RADIOS

FIELD OF THE INVENTION

This invention relates to communications systems and more specifically to a method and apparatus for efficiently coordinating the transfer of information between a plurality of radios and a base station.

BACKGROUND ART

A typical radio-frequency (RF) communications system consists of a full duplex base station and a plurality of half duplex radios. Information is typically transferred between the radios and the base station on a single RF channel consisting of a duplex pair of frequencies. The first frequency or the forward channel is used by the radios to transmit information to the base, and the second frequency or the reverse channel is used exclusively by the base to transmit information to the radios. Because there is a plurality of radios and only one forward channel, transmission time on the forward channel must be shared by the various radios. This channel sharing creates a potential for conflict among the radios as the radios compete for transmission time. To resolve the possible conflicts (known as collisions) and to coordinate the exchange of information between the radios and the base, a multiple access protocol is implemented. A protocol which is commonly used is "slotted Aloha".

Slotted Aloha divides time on the forward channel into periods, and at the start of each period, the base announces a selected number of fixed length time slots during which the half duplex radios may transmit information frames on the forward channel. Upon receipt of the fixed slot information, each radio having an information frame to transmit randomly selects one of the announced time slots, and transmits an information frame during the selected time slot. In such a system, three possible events may occur during each time slot. First, because the time slot selection process is random, a slot may be left unselected and wasted. Second, a single information frame may be received during the time slot, in which case, the information is successfully received by the base. Third, a collision occurs. In such an instance, all of the information frames received are disregarded by the base and the sending radios must transmit the information again during the next period.

Slotted Aloha has a number of significant drawbacks. First of all, slotted Aloha suffers from low utilization. It is generally accepted that for slotted Alhoa, only about 35% of the forward channel time is actually used for successful transmissions. The rest of the channel time is wasted on collisions and unselected slots. Second, slotted Aloha becomes unstable under heavy channel loading. Above a utilization rate of about 35%, the efficiency of slotted Aloha begins to drop rapidly. This means that during peak traffic times when successful transmissions are needed the most, slotted Aloha's efficiency is at its worst. Third, slotted Aloha coordinates the exchange of information between the base station and the radios by assigning fixed length time slots. These time slots are fixed in length regardless of the needs of the radios. Therefore, if a radio has a short information frame requiring only half of a time slot to transmit, the remaining half of the time slot is wasted. Thus, the slotted Aloha protocol inherently wastes a large amount of forward channel capacity.

Other methods such as carrier sensing and polling have been implemented to try to improve efficiency, but these methods have not produced much better results. Therefore, a need exists for a more efficient method and apparatus for coordinating the transfer of information between a plurality of radios and a base station.

SUMMARY OF THE INVENTION

To overcome the shortcomings of the prior art, the present invention provides an improved coordinating method and apparatus whereby transmissions on the forward channel are scheduled. In accordance with the invention, the base station divides time on the forward channel into periods and heralds each period with a time assignment frame. The time assignment frame designates selected time slots in the period as request times slots and also announces reserved information time slots during which selected radios may transmit an information frame on the forward channel. In effect, the time assignment frame schedules the activities on the forward channel for the upcoming period.

If a radio has an information frame to transmit, it consults the assignment frame to determine whether an information time slot has been reserved for it. If so, the radio may transmit an information frame on the forward channel during the reserved time slot. Otherwise, the radio needs to request permission to access the forward channel. To submit a request, the radio consults the time assignment frame to determine how many request time slots have been scheduled in the upcoming period. The radio then randomly selects one of the request time slots and sends a request frame on the forward channel during the selected request time slot. Preferably, the request frame includes information regarding how much time the radio will need to transmit its information. Thereafter, the radio waits for the next time assignment frame to ascertain whether it has been reserved an information time slot. If no reservation is forthcoming, the radio submits another request frame in the following period.

After announcing the information time frame, the base receives information frames and request frames from the radios. Preferably, for each request time slot, the base determines whether one and only one request frame was received. If so, a successful request was made and the base reserves for the radio sending the successful request an information time slot. Preferably, the reserved time slot has a length generally equal to the length requested in the request frame. In the next time assignment frame, the base announces the reserved information time slot along with the request time slot information for the new period. This process is repeated each period.

According to the method and apparatus of the present invention, a radio may only transmit an information frame on the forward channel if it has been reserved an information time slot. If an information slot is reserved, the radio is assured that it may transmit information during that time slot with no interference from any other radio. Thus, by scheduling time on the forward channel, conflicting transmissions are minimized. Also, because the reserved information time slots are only as long as are needed by the radios, practically no portion of the reserved time slot is wasted. Therefore, the method and apparatus of the present invention utilizes forward channel capacity much more efficiently.

DETAILED DESCRIPTION OF THE PREFERRED EMBODIMENT

Figure 1:
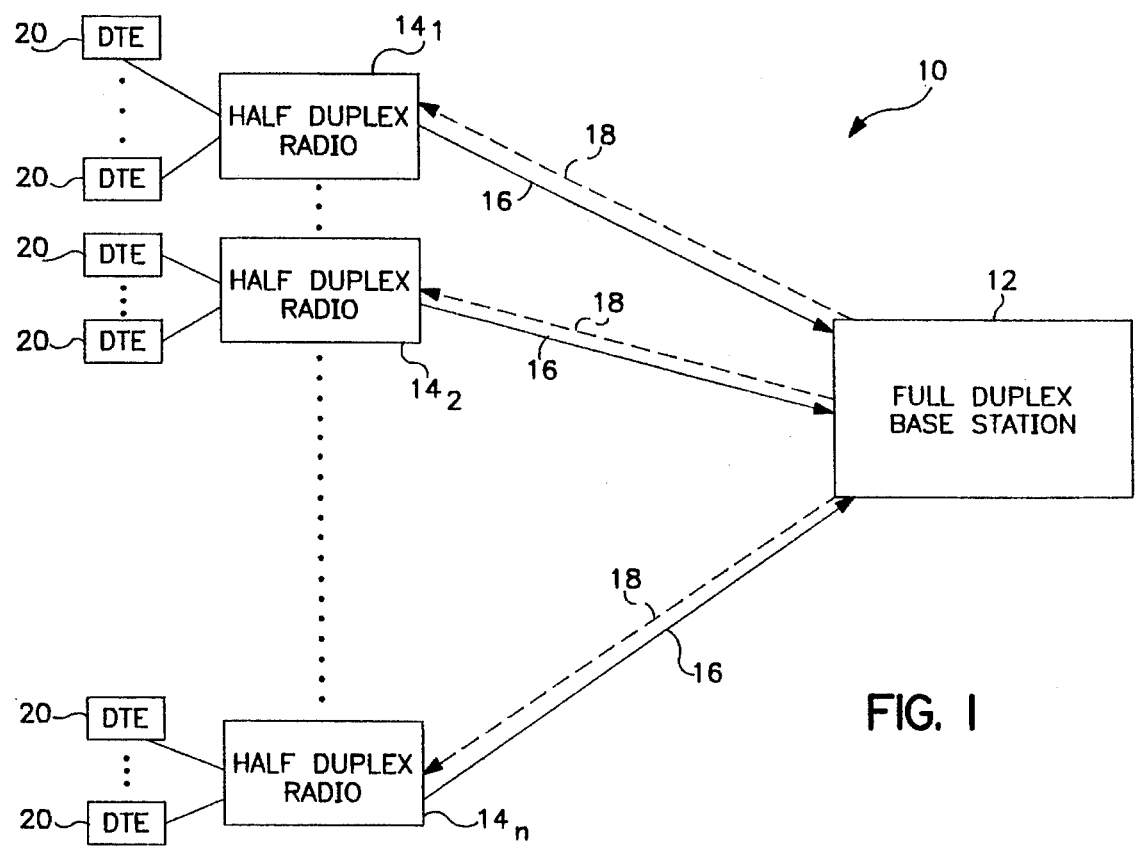
FIG. 1 is a block diagram of a communications system wherein the method of the present invention is implemented.

Referring to FIG. 1, there is shown a block diagram of a communications system 10 wherein the method of the present invention is implemented. The system 10 preferably comprises a full duplex base station 12 and a plurality of half duplex radios $14_1$–$14_n$. Each of the half duplex radios 14 may have coupled to it a plurality of data terminal equipment (DTE) 20 which rely on the radio 14 to communicate with the base 12. The DTE's 20 may take on a variety of forms including that of a computer. Because more than one DTE 20 may be coupled to each half duplex radio 14, each DTE 20 preferably has a virtual circuit number associated with it to allow the radio 14 and the base 12 to easily ascertain with which DTE 20 it is communicating.

The base 12 and the radios 14 communicate with each other through a single radio frequency (RF) channel having a forward channel 16 and a reverse channel 18. The forward channel 16 is used by the radios 14 to transmit information to the base 12, and the reverse channel 18 is used exclusively by the base 12 to send information to the radios 14. Preferably, base 12 and radios 14 communicate with each other by sending trains of signals called "frames" between them. The framing of signals is well known in the art and will not be described herein. To efficiently coordinate the transfer of information between base 12 and the radios 14, system 10 implements the method of the present invention.

Figure 2:
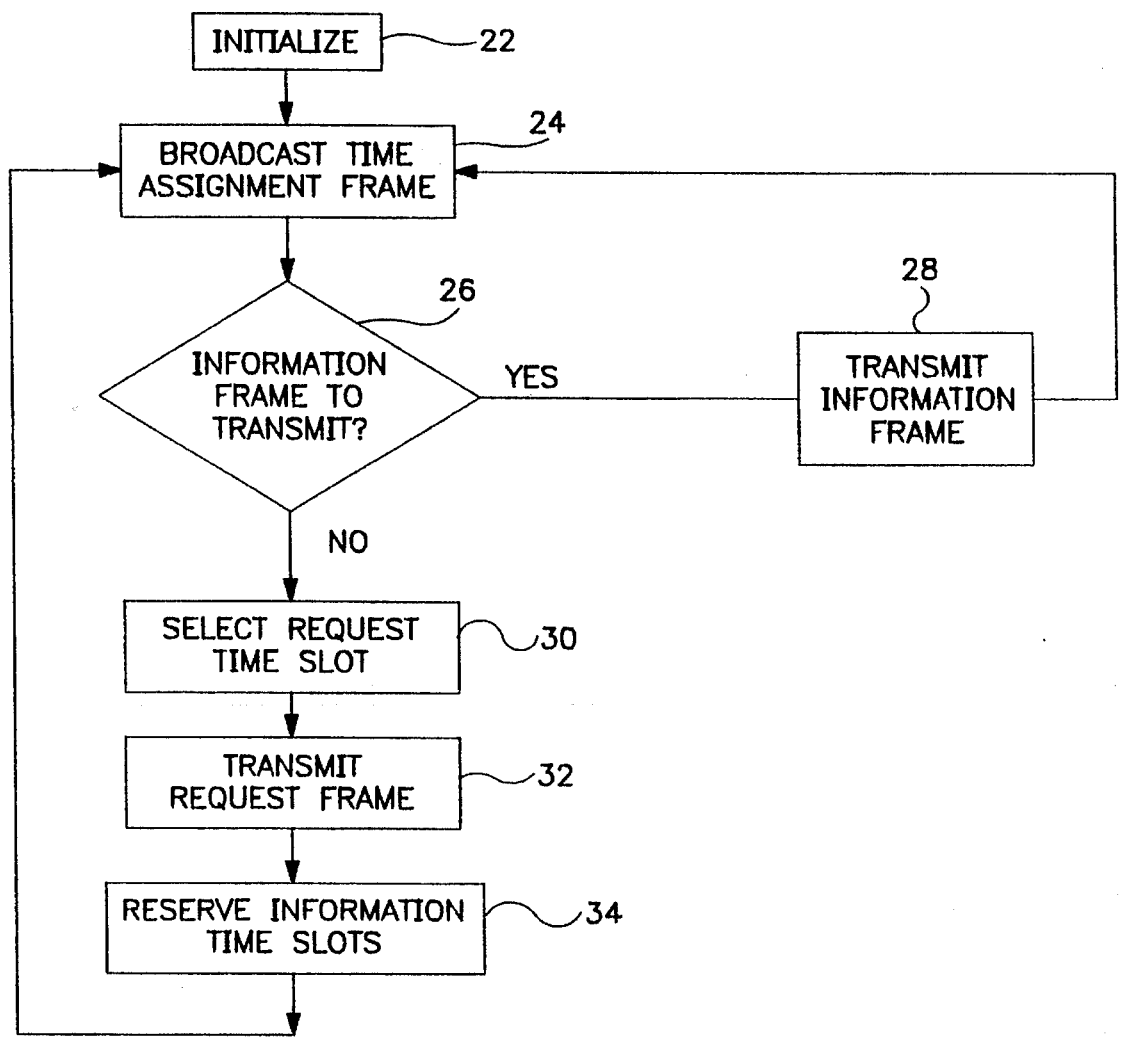
FIG. 2 is a general flowchart of the method of the present invention.

With reference to FIG. 2, a simplified flowchart of the method of the present invention is provided, wherein the first step 22 is to initialize the system. That is, all of the components of the system 10 are reset to put them into the proper states for start-up. Initialization is system specific and depends greatly on the individual components used. After initialization, the base 12 begins operation by broadcasting 24 on the reverse channel 18 a time assignment frame (hereinafter, assignment frame). The assignment frame signals the beginning of a period, and consecutive assignment frames serve to divide time on the forward channel into a plurality of periods. It is during these periods that information may be transmitted on the forward channel 16 from the radios 14 to the base 12.

The assignment frame contains several pieces of information which are of importance to the radios 14. One such piece of information is the number of fixed-length request time slots that will be reserved on the forward channel in the upcoming period. It is during these request slots that the radios 14 may use the forward channel to transmit request frames to the base to request permission to send an information frame. The assignment frame also includes information regarding whether information time slots have been reserved on the forward channel to allow selected radios to transmit an information frame to the base. The radios 14 use these pieces of information to determine their courses of action. Since the system has just been initialized, no information time slots have yet been reserved, but the assignment frame does announce several request time slots in the upcoming period to allow the radios to submit requests to send an information frame. For the sake of example, assume two request time slots are announced.

After the assignment frame is received, each radio having an information frame to transmit determines 26 whether the base has reserved for it an information time slot. Only if an information time slot has been reserved, and only during that time slot, may a radio transmit 28 an information frame to the base, Otherwise, the radio requests and awaits permission from the base to transmit an information frame. Since no information time slots have thus far been reserved, none of the radios may as yet send information to the base 12.

That being the case, the radios 14 now request permission from the base 12 to send an information frame. To do so, each radio first selects 30 one of the two request time slots announced by the assignment frame, and then transmits 32 a request frame to the base 12 during the selected request time slot. Preferably, the selection of the request slot is random. For each request time slot, there are three possible scenarios. First, the slot may be left unselected since the selection process is random. Second, more than one request frame may be received during the time slot, resulting in a collision. In such an instance, the base 12 disregards all of the colliding request frames; thus, the radios sending the colliding frames need to send another request frame in the next period. Third, a single request frame may be received during the time slot, in which case, a successful request has been made. In response, the base 12 designates the radio sending the successful request frame as a sending radio, and reserves 34 an information time slot for the sending radio in the next period during which the sending radio may transmit on the forward channel an information frame to the base 12. For the sake of example, assume that two successful requests were received and two information time slots have been reserved for the next period.

After information time slots are reserved 34, the base 12 once again sends 24 an assignment frame to signal the start of a new period. Included in this assignment frame is information regarding the information time slots that were reserved during the previous period, as well as the announcement of new request slots. After the assignment frame is received by the radios, each of the two sending radios for which information time slots have been reserved learns 26 of the reservation, and transmits 28 an information frame during the reserved time slot. The rest of the radios go through the requesting process as previously described.

Figure 3:
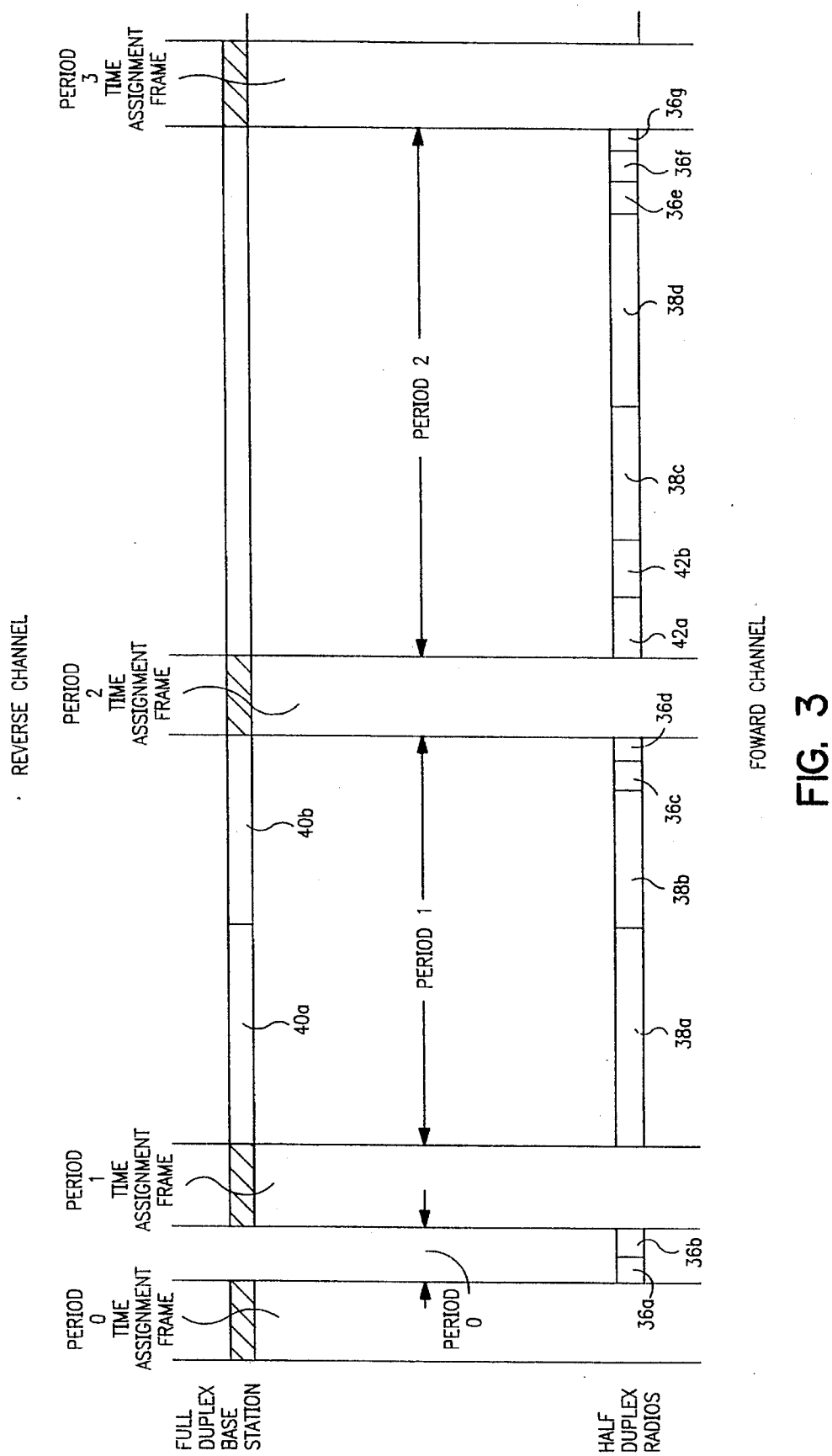
FIG. 3 is a time line showing the activity on the forward and reverse channels of an RF channel wherein the method of the present invention is implemented to better illustrate the invention.

The method of the present invention may be more clearly described with reference to the time line shown in FIG. 3, wherein the top portion of the figure shows the activity by the base 12 on the reverse channel, and the bottom portion of the figure shows the activity by the radios 14 on the forward channel. Time on both channels is divided into periods 0, 1, 2 by the time assignment frames. Period 0 represents the period immediately following initialization of the system 10, and periods 1 and 2 represent two consecutive subsequent periods. The example used to describe FIG. 2 will now be illustrated with reference to FIG. 3.

Immediately after initialization, the base 12 sends a period 0 time assignment frame to schedule the activities on the forward channel during period 0. Since no request frames have yet been received, no reserved time slots are announced for period 0. Thus, period 0 only has two request time slots 36a, 36b scheduled. After receiving the period 0 assignment frame, each radio 14 having information to transmit randomly selects one of the request time slots 36a, 36b and sends a request frame during the selected request slot. For illustrative purposes, assume radio $14_1$ sends a request frame during slot 36a and radio $14_2$ sends a request frame during slot 36b so that two successful requests are received by the base 12 during period 0.

In response to the successful requests, the base 12 reserves two information time slots 38a, 38b on the forward channel in the following period (period 1) during which the sending radios $14_1$, $14_2$ may each send an information frame. In the period 1 time assignment frame, the base 12 announces these reserved information slots 38a, 38b along with information regarding period 1 request slots 36c and 36d. After receiving the period 1 assignment frame, radio $14_1$ knows that information slot 38a has been reserved for it, and radio $14_2$ knows that information slot 38b has been reserved for it. Therefore, during the appropriate time slots, the radios $14_1$, $14_2$ may each send an information frame on the forward channel with no interference from the other radios. From this example, it can be seen that very little time on the forward channel is wasted. Because there is no interference from other radios during the reserved information time slots 38a, 38b, these time slots are entirely devoted to tile transmission of useful information. In contrast to slotted Aloha, there can be no collisions during these time slots to cause the slot to be wasted. In the method of the present invention, collisions can only occur during the request time slots 36. Request time slots, 36, however, are of relatively short duration preferably having a length of only four octets plus framing overhead. Because of the short duration of the request time slots 36, collisions during these time slots do not cause a significant waste of channel time.

As in period 0, during the request slots 36c, 36d in period 1, each radio with information to transmit randomly selects a request slot, and sends a request frame during the selected request slot to ask the base 12 for permission to send an information frame. Assuming that two successful requests are once again received, the base 12 reserves two information slots 38c, 38d in period 2. These slots are announced in the period 2 time assignment frame along with request slots 36e, 36f, 36g. As a result, two sending radios are allowed to transmit information frames during the reserved time slots 38c, 38d in period 2. This request and reservation process is repeated each period.

Note that in period 1, while the radios are sending information frames and request frames on the forward channel, the base 12 may use the reverse channel to send information frames 40a, 40b to selected radios. To allow the selected radios to acknowledge the receipt of these information frames 40a, 40b, fixed-length acknowledgment time slots 42a, 42b are announced in the period 2 time assignment frame and reserved at the beginning of period 2 to allow the selected radios to send acknowledgement frames. Preferably, all acknowledgement slots have a length of five octets plus framing overhead.

Figure 4:
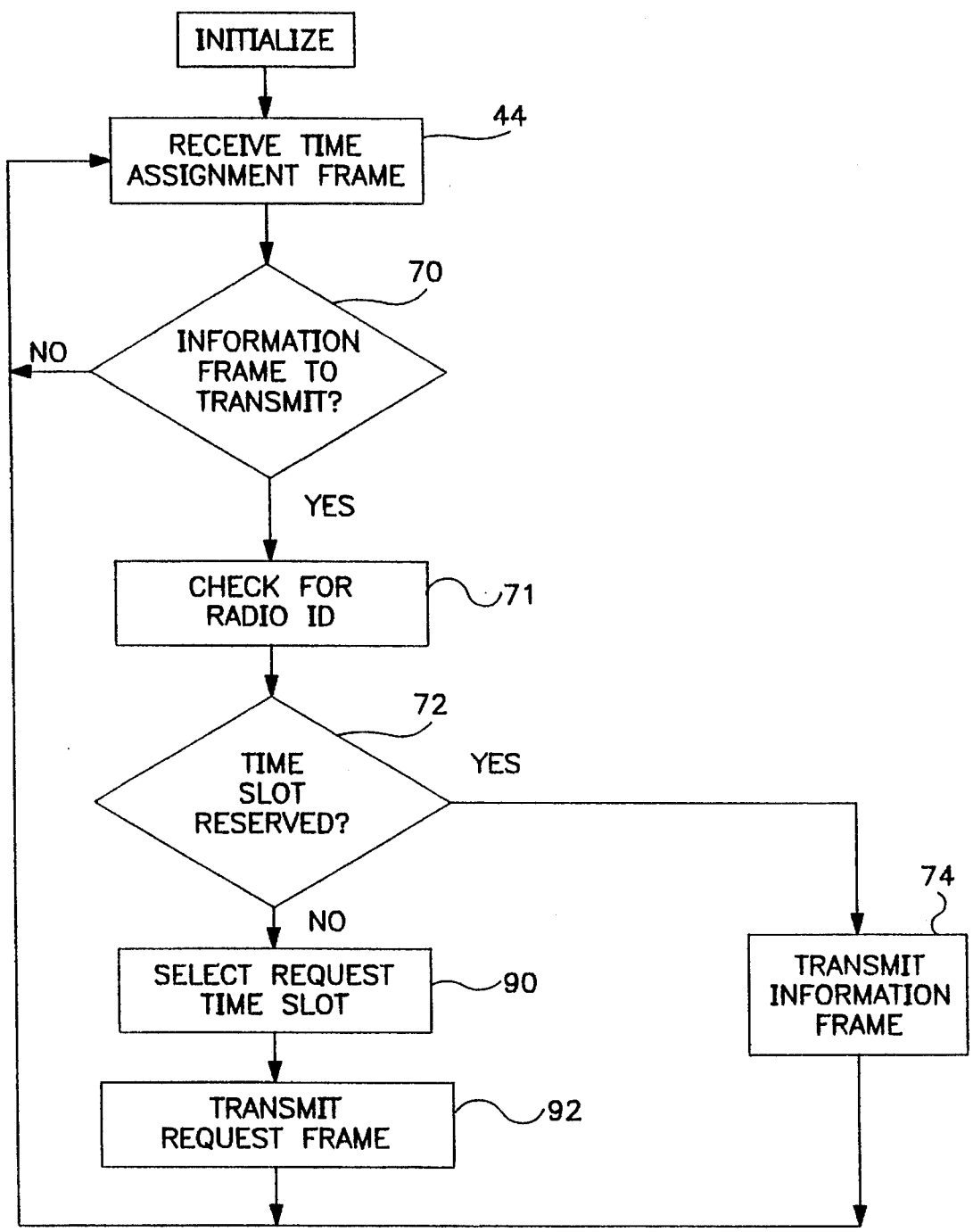
FIG. 4 is a flowchart of the first sub-method of the invention implemented by each of the radios shown in the system of FIG. 1.

Thus far, the method of the present invention has been described as a system-wide method for coordinating the transfer of information. The invention will now be described in greater detail by dividing the method into two sub-methods, a first sub-method implemented by each of the radios 14 and a second sub-method implemented by the base 12. A flowchart of the sub-method implemented by each of the radios is provided in FIG. 4. Each radio begins operation by initializing itself to ensure that it is in the proper state for start-up. Thereafter, the radio waits to receive 44 a time assignment frame from the base 12 to provide it with the necessary information with which to decide on a course of action.

Figure 5:
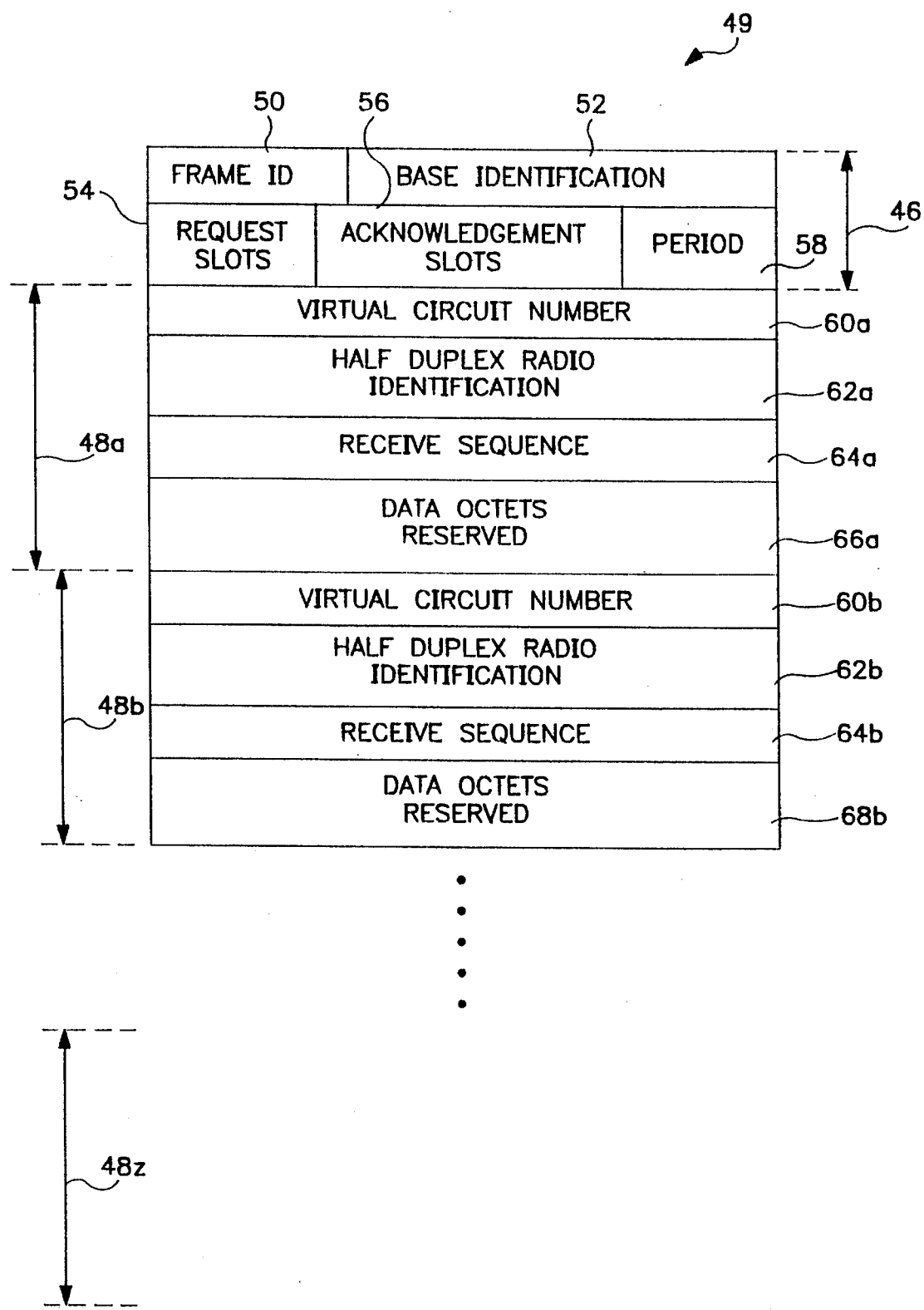
FIG. 5 is a diagram showing the preferred frame format for a time assignment frame.

An example of an assignment frame is provided in FIG. 5, wherein the frame 49 has a general information section 46 which applies to all radios, and zero or more radio specific sections 48. Each radio specific section 48 applies to only one particular radio. Each section 46, 48a includes a plurality of fields, each field containing a particular piece of information. As shown in FIG. 5, the general information section 46 includes five different fields. The frame ID field 50 contains a number which specifies the type of frame being sent. For example, an assignment frame may have an ID number of "1" while an information frame may have an ID number of "2". This ID number tells the receiver of the frame what type of frame is being sent to allow the receiver to properly disassemble the frame to extract information therefrom. The base identification field 52 contains the identification code of the base station so that the radio may determine with which base it is communicating. This information may be important if a plurality of base stations are using the same RF channel section 46 further includes a request slots field 54 and an acknowledgement slots field 56. The information in these fields 54, 56 indicate to the radio the number of request time slots and the number of acknowledgement time slots, respectively, there will be in the upcoming period. The radio needs this information to randomly select a request slot during which to send a request frame, and to compute the proper time at which to send the request frame. The period field 58 contains an index number between 0 and 3 which is used to indicate the period that the assignment frame is heralding- By monitoring this field, the radio can ascertain whether it has missed a prior assignment frame.

After the general information section 46 come zero or more radio specific sections 48. Section 48a contains four fields. The virtual circuit number field 60a contains the identification code of a specific DTE 20. Because more than one DTE 20 may be coupled to each radio 14, this field 60a is used to designate a specific DTE 20. Following field 60a is the half duplex radio identification field 62a which contains the identification code of a specific radio 14. By monitoring this field 62a, each radio can ascertain whether the radio specific section 48a is meant for it. The receive sequence field 64a contains the sequence number of any frame received by the base from a particular radio, and this number is used to ensure that frames are received in the proper sequence. In addition, section 48a includes a data octets reserved field 66a. A non-zero number in this field 66a tells the radio identified in field 62a that it has a reserved information time slot in the upcoming period during which it may transmit an information frame on the forward channel. The information in field 66a also tells the radio how long a slot has been reserved. A single time assignment frame 49 may include a plurality of radio specific sections 48a–48z, each directed at a different radio. The general information section 46 and all of the radio specific sections 48 are preferably packed as shown in FIG. 5 and sent as a single assignment frame to all of the radios.

Referring again to FIG. 4, after each radio receives the assignment frame 49, the radio determines 70 whether it has any information to send. If not, the radio just continues monitoring 44 assignment frames. Where the radio does have information to send, it checks 71 the assignment frame 49 for a radio specific section directed at it. This is accomplished by searching each of the radio specific sections 48 of the assignment frame (FIG. 5), and specifically, the half duplex radio identification field 62, for the radio's identification code. If the identification code is found, the base 12 is sending one of two messages to the radio. The base may be acknowledging the receipt of a frame previously sent by the radio, or the base may be telling the radio that it has reserved an information time slot for the radio. To determine 72 whether an information time slot has been reserved for the radio, the radio looks at the data octets reserved field 66 of the radio specific section 48. If field 66 has a value of zero, no information time slot has been reserved and the base is only acknowledging the receipt of a frame previously sent by the radio. But, if the data octets reserved field 66 contains a non-zero number, it means that an information time slot has been reserved for the radio.

In such an instance, the radio may transmit 74 an information frame to the base during the reserved information time slot. To transmit an information frame, the radio first determines the point in real time at which it should begin its transmission. The computation of the start time is best illustrated by way of example. With reference to FIG. 3, suppose information slot 38d in period 2 has been reserved for the radio to send an information frame. The time at which the period 2 time assignment frame ends is known since the radio monitors the assignment frame. Thus, the proper start time for slot 38d may be arrived at by adding the lengths of time occupied by acknowledgement slots 42a, 42b and information slot 38c to the end time of the period 2 assignment frame.

This proper start time can be computed in two steps. First, the number of acknowledgement slots are announced in field 56 of the assignment frame 49. Because acknowledgement slots are of fixed time length, the time occupied by slots 42a and 42b can be computed by multiplying the number of acknowledgement slots (two in the present example) by the fixed time length of an acknowledgement slot. Second, the time occupied by slot 38c may be determined by consulting the period 2 time assignment frame. Specifically, the radio looks at the radio specific section 48 immediately preceding its own and extracts the value from the data octets reserved field 66. This information tells the radio how many octets have been reserved for the previous radio. By converting octets into units of real time (all operation known in tile art), the time length of reserved slot 38c is obtained. Knowing the time lengths of slots 42a, 42b, and 38c, the start time of slot 38d is computed using a simple summing operation. The radio waits until this proper start time and then begins transmitting its information frame on the forward channel.

Figure 6:
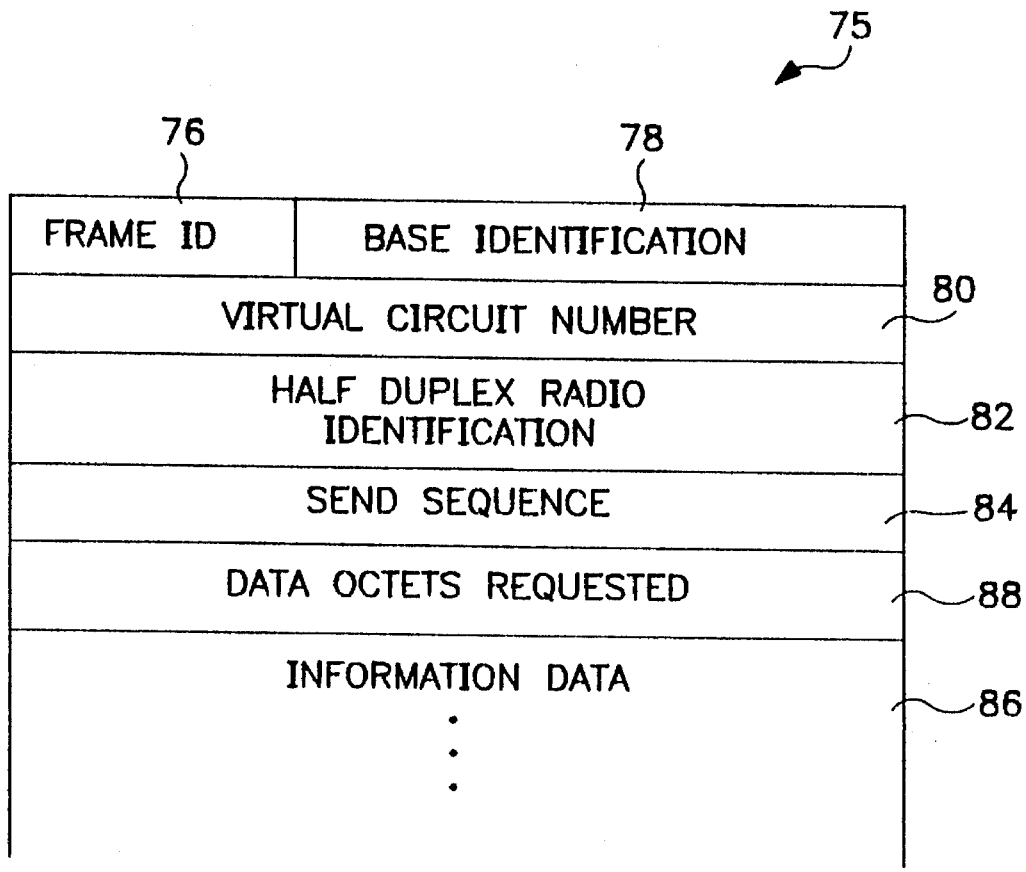
FIG. 6 is a diagram showing the preferred frame format for an information frame.

The information frame sent by the radio preferably has the format shown in FIG. 6. The frame ID field 76 and the base identification field 78 contain information similar to, and serve the same purposes as, the identically named fields in the assignment frame 49. The virtual circuit number field 80 and the half duplex radio identification field 82 tell the base which specific DTE 20 and radio 14, respectively, are sending the information frame. The send sequence field 84 gives the proper sequence number of the information frame to ensure that the base knows the proper ordering of the frame, and the information data field 86 contains the actual data that the radio is sending to the base.

An interesting aspect of the information frame 75 is the data octets requested field 88. A non-zero number in this field 88 tells the base that the radio has another information frame ready to send. In effect, field 88 allows the radio to request an information slot at the same time it is sending an information frame, thereby, bypassing the normal requesting process. Since the information frame 75 is always received by the base, a request in field 88 assures the radio that its request for another slot will be received. Thus, the radio may "chain" together a plurality of information frames. This chaining capability is important for applications in which the timing of information transfer is important. More will be said about chaining in a subsequent section.

Referring again to FIG. 4, where a radio has information to send but has not been reserved an information time slot, the radio goes through the regular requesting process. The radio begins by selecting 90 a request time slot. Since the number of request slots is given in field 54 of the assignment frame 49, the radio randomly selects a number from one to and including the number of slots announced. The radio then transmits 92 a request frame on the forward channel during the selected request slot. With reference to FIG. 3, suppose the radio selects request slot 36g in period 2. The end time of slot 38d may be calculated using the same method as that previously described for computing the start time for transmitting an information frame. Given the end time of slot 38d, the start time of slot 36g is obtained by adding the time lengths of request slots 36e, 36f to the end time of slot 38d. Since request slots have fixed time lengths, and since the radio knows it has selected the third request time slot 36g, the radio adds two request time lengths to the end time of slot 38d to arrive at the start time of slot 36g. The radio waits for the proper start time and then begins transmitting its request frame on the forward channel.

Figure 7:
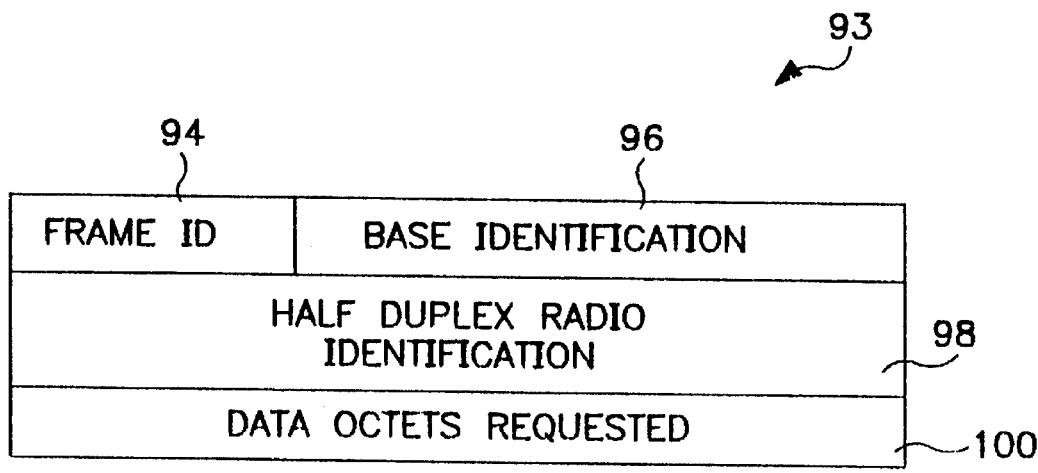
FIG. 7 is a diagram showing the preferred frame format for a request frame.

A request frame preferably has the format shown in FIG. 7, wherein the frame 93 includes four fields. The frame ID field 94, the base identification field 96, and the half duplex radio identification field 98 contain information similar to, and serve the same purposes as, the identically named fields in the information frame 75. An advantageous aspect of the request frame 93 is the data octets requested field 100. When the radio requests a reserved information slot, it lets the base know how much information it has to transmit by putting the number of octets of information in field 100. When the base receives the request frame 93, it knows how long an information time slot to reserve for the radio. Thus, the base will only reserve as long a time slot as is needed by the radio to send the desired information, thereby, eliminating the wasted channel time inherent in the fixed length slots of the slotted Aloha protocol.

After sending 92 (FIG. 4) a request frame, the radio loops back to step 44 to receive another time assignment frame. If a radio sends a request frame but the base does not reserve for it an information slot, the radio sends another request frame during the next period, and the radio continues to send request frames until either the base gives it a reservation or a maximum number of tries (20, for example) has been reached, at which time the radio gives up. The radio's course of action at that point depends on the specific function of the radio. After receiving 44 the time assignment frame, the radio repeats steps 70–92 as described above. Steps 44–92 are repeated each period.

Figure 8:
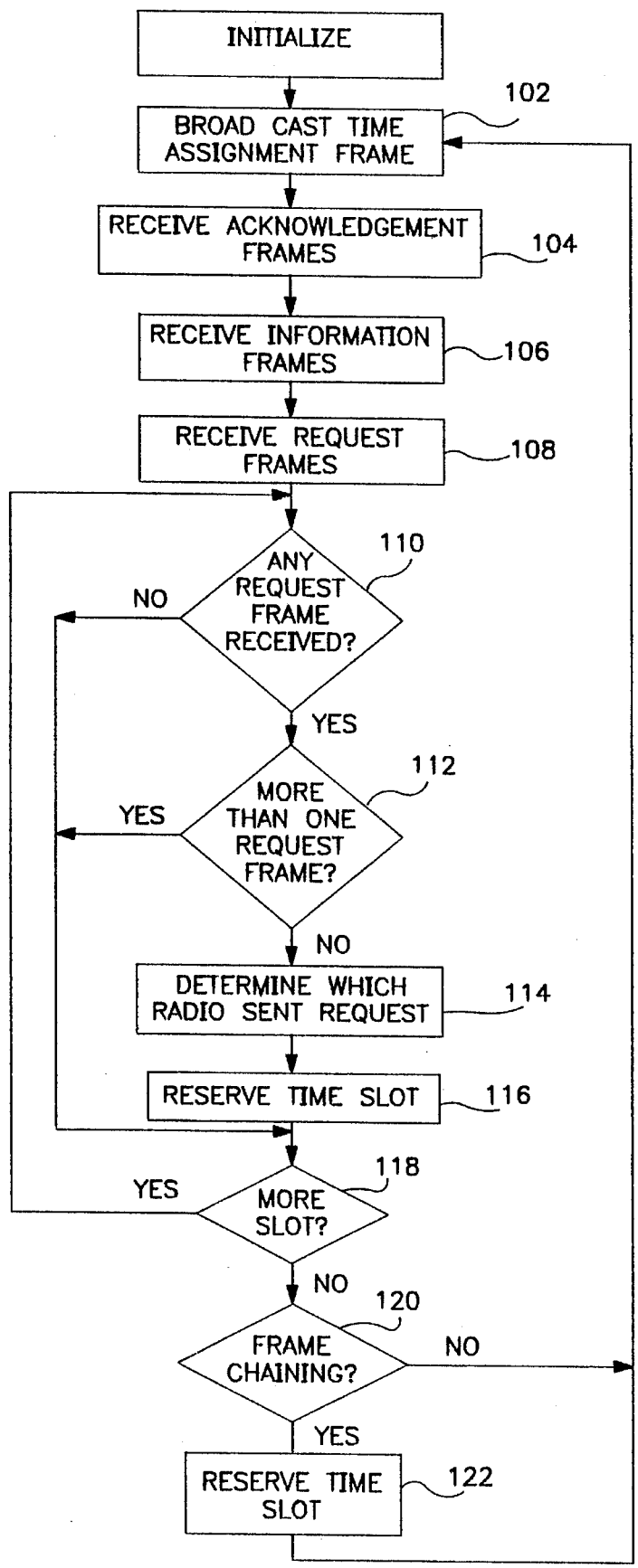
FIG. 8 is a flowchart of the second sub-method of the invention implemented by the base station shown in the system of FIG. 1.

With reference to FIG. 8, the second sub-method of the present invention implemented by the base 12 will now be described. FIG. 8 shows a flowchart of the sub-method, wherein the base 12 begins with initialization to reset itself to the proper state for start-up. The base then begins actual operation by broadcasting 102 on the reverse channel a time assignment frame 49 which contains information regarding acknowledgement time slots, reserved information time slots, and request time slots, as shown in FIG. 5, to schedule the activities on the forward channel for the upcoming period. Thereafter, the base 12 receives on the forward channel acknowledgement 104 frames during the acknowledgement slots, information 106 frames during the reserved information time slots, and request 108 frames during the request time slots.

After the period announced by the time assignment frame is over, the base 12 checks its records of each of the request time slots to ascertain whether a request frame was successfully received during each request slot. Base 12 begins by checking 110 the first request slot to determine whether any request frames were received. If not, the base 12 proceeds to the next request slot. If at least one request frame was received, base 12 then determines 112 whether more than one request frame was received. If more than one request frame was received, base 12 is unable to extract useful information from the colliding frames and thus, disregards any information received and goes on to the next request slot. If only one request frame was received, then a successful request was made, and the base 12 determines 114 which radio sent the request by looking in the half duplex radio identification field 98 (FIG. 7) of the successful request frame. The base then designates the radio sending the successful request as a sending radio and reserves 116 an information time slot in the next period for the sending radio, during which the sending radio may transmit an information frame on the forward channel.

In reserving 116 an information time slot, base 12 consults the data octets requested field 110 (FIG. 7) of the sending radio's request frame to determine how much information the sending radio needs to transmit. Based on the information in field 110, the base 12 reserves an information time slot which is only as long as is needed by the sending radio to send the desired information frame, so that no part of the reserved information time slot is wasted. This variable length aspect of the present invention is a significant improvement over the fixed length time slots of the prior art.

There may be instances where, even though a successful request is received during a request slot, the base does not want to give a particular radio a reserved information time slot in the next period. Suppose, for example, that a radio having very low priority sends a successful request to the base during a time when traffic on the forward channel is very heavy. In such a situation, the base may want to defer giving the sending radio a reservation until a time when traffic is lighter. Base 12 may defer by including in the assignment frame 49 (FIG. 5) a radio specific section 48 having the sending radio's identification code in field 62 but having a zero value in the data octets reserved field 66. This information lets the sending radio know that its request has been received but that no information time slot has yet been reserved. Thus, the sending radio knows to stop sending request frames and to just monitor future assignment frames for a reserved information time slot. This deferment aspect of the present invention allows the base 12 to better balance the work load at heavy traffic times.

After step 116, the base 12 goes on to check 118 the next request slot. Steps 110–118 are repeated until all of the request slots have been checked. Thereafter, base 12 checks 120 all of the information frames just received to determine if any of the radios transmitting an information frame is attempting to "frame chain". Recall that each information frame 75 (FIG. 6) includes a data octets requested field 88 which allows a radio to request a reserved information slot at the same time it is sending information data, thereby, bypassing the normal requesting process. By looking at field 88 of each information frame 75 just received, base 12 can determine whether any of the sending radios wants to reserve another information time slot. Specifically, if field 88 has a value of zero, no additional time slot is requested. However, if field 88 contains a non-zero value, it means that the radio wants to reserve another information time slot. Thus, the base 12 will reserve for the radio an information time slot having a length sufficient to allow the number of octets specified in field 88 to be transmitted. Normally, an information time slot is reserved for the radio in the next period, but if the radio has low priority and the forward channel traffic is heavy, the base 12 may defer reserving an information slot for the radio until another subsequent period.

As previously mentioned, this chaining capability is useful in applications where the timing of transmissions is important. However, because the reservation of future information time slots may be deferred as described above, chaining by itself may not be sufficient to guarantee the timeliness of transmissions in time-critical applications such as voice, video, and facsimile transmissions. In such applications, the base 12 preferably performs a "time elapsed" analysis in conjunction with chaining to guarantee the timeliness of transmissions. To elaborate, suppose a radio needs to send an information frame every 50 milliseconds and the base 12 is aware of this requirement. In its first information frame 75 transmitted to the base 12, the radio includes a non-zero value in the data octets requested field 88 to inform the base 12 that it has another information frame to send. Since the base 12 knows that the radio has more information to send, and that there can be no more than 50 milliseconds between transmissions, the base 12 makes sure that an information time slot is reserved for the radio before 50 milliseconds have elapsed since the last transmission. Thus, the timeliness of transmissions is guaranteed, allowing the method of the present invention to support time-critical applications. After checking all of the information frames, the base 12 loops back to announce 102 another assignment frame and steps 102–122 are repeated.

Figure 9:
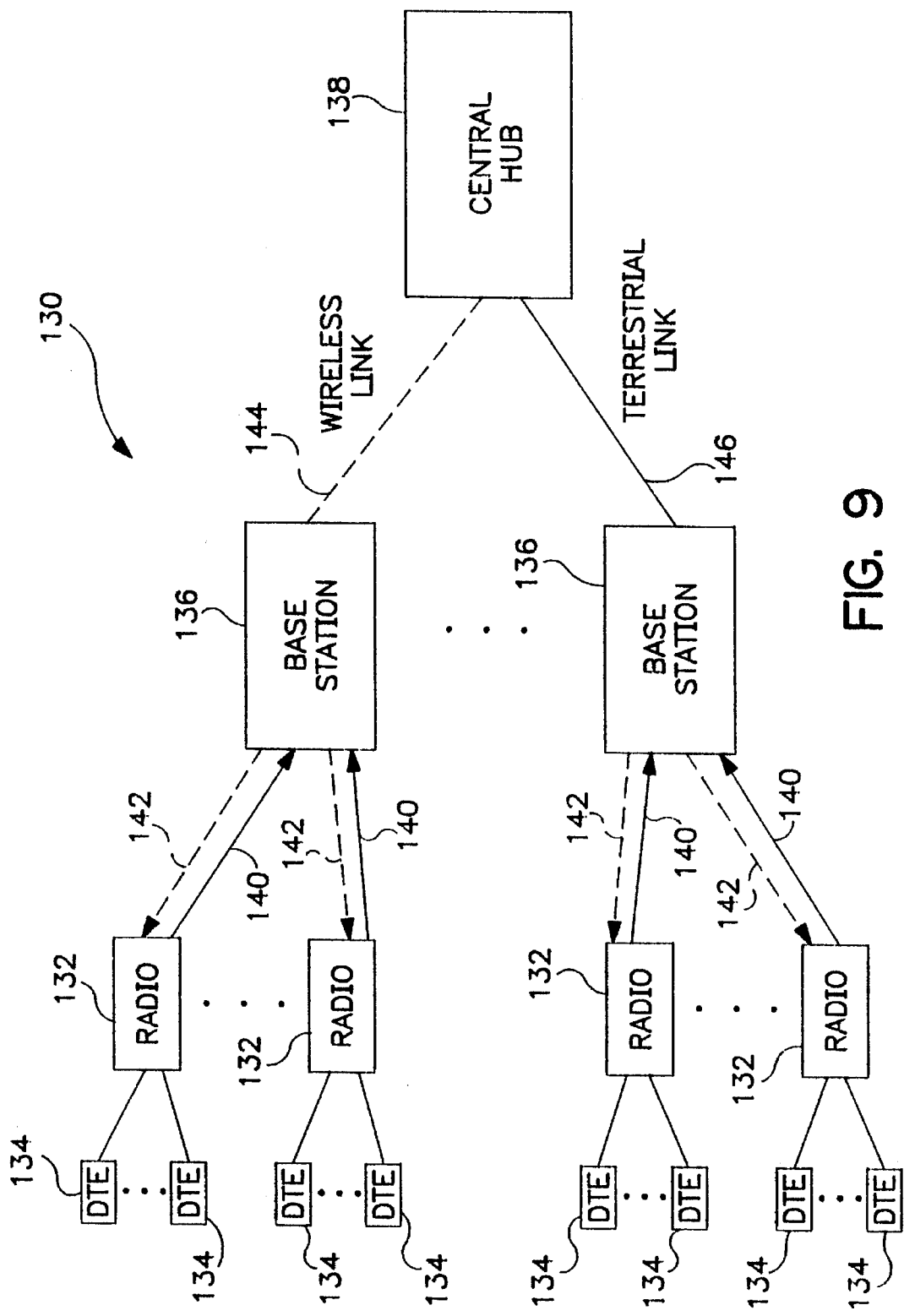
FIG. 9 is a block diagram of a metropolitan area network wherein the method of the present invention is implemented.

Thus far, the method of the present invention has been described as a method for coordinating the transmission of information in a local communications system comprising a plurality of radios and a single base. However, the invention is not so limited but may, instead, be implemented in a metropolitan area network (MAN). An example of a MAN is shown in FIG. 9, wherein the MAN 130 comprises a plurality of half duplex radios 132 each having at least one DTE 134 attached thereto, a plurality of full duplex base stations 136, and a central hub 138. Each of the radios 134 preferably communicates with one of the base stations 136 through an RF channel having a forward channel 140 and a reverse channel 42. The base stations 136 may all communicate with the radios 32 using the same RF channel or each base 136 may use a different RF channel. Each base station 136 communicates with the central hub 138 via a communications link. The link may be a wireless link 144 or it may be a terrestrial link 146 (telephone link). Through these communications links 144, 146, the central hub 138 controls all of the base stations 136. A MAN 130 such as that shown in FIG. 9 is typically set up in a major metropolitan area to centralize and to coordinate communication within that area.

Because all of the base stations 136 in a MAN are controlled by the central hub 138, the base stations 136 merely act as full duplex receive and broadcast stations. Therefore, in a MAN, the method of the present invention is implemented by the central hub 138 and the radios 132 with the base stations 136 acting only as intermediaries. With respect to the radios 32, control of the base stations 136 by the central hub 138 is transparent. Thus, as far as the radios 132 are concerned, they are still communicating only with a single base 136. For this reason, the radios 132 in MAN 130 implement the method of the present invention by performing the same steps as those previously described in connection with a local communications system.

With regard to the central hub 138, the hub performs substantially the same steps as those previously described in connection with a base station in a local communications system, except that the hub 138 does not transmit and receive signals directly to and from the radios 132. Instead, the hub 138 goes through one of the base stations 136 in order to communicate with the radios 132. Thus, to send an information frame to the radios 132, the hub 138 first sends the information to a selected base station 136 and then causes the selected base station 136 to send the information frame to the radios 132. Likewise, to receive either request frames or information frames from the radios 132, the hub 138 first causes a selected base station 136 to receive the frames from the radios 132 and then causes the selected base station 136 to send the frames to the hub 138. In substantially all other respects, the central hub 138 implements the method of the present invention in the same manner as a base station in a local communications system. A MAN 130 is desirable because it allows communication within a large area to be controlled by a single source. By implementing the method of the present invention in a MAN, communication within a large metropolitan area is more efficiently coordinated.

Figure 10:
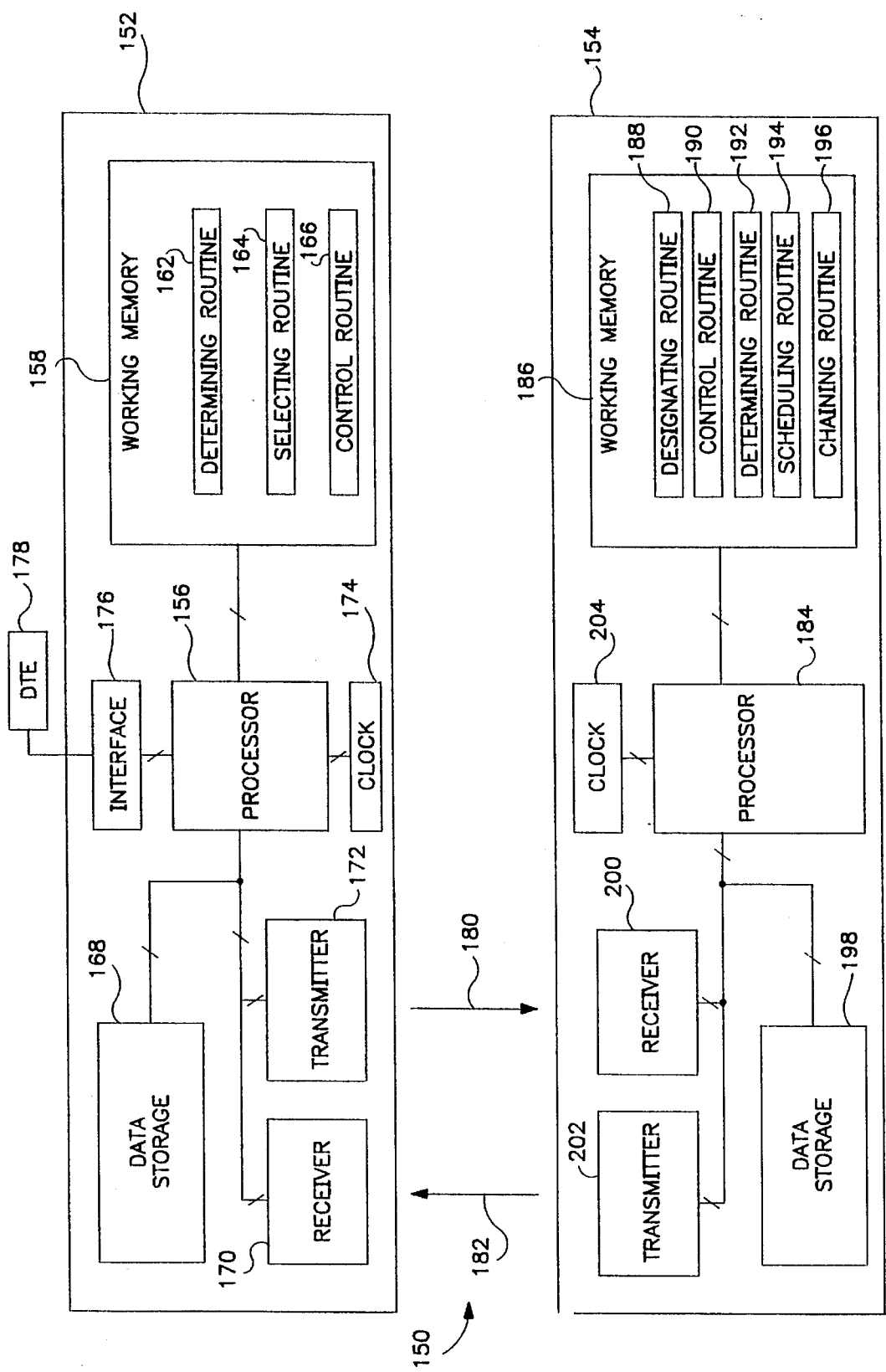
FIG. 10 shows a detailed block diagram of a radio for implementing the first sub-method of the present invention, and a detailed block diagram of a base station for implementing the second sub-method of the present invention.

The method of the present invention is now fully disclosed. A radio 152 and a base station 154 which may be employed to implement the method of the present invention are shown in FIG. 10. The radio 152 preferably comprises a processor 156, working memory 158 having a plurality of computer routines 162–166 stored therein, data storage 168, receiver 170, transmitter 172, real-time clock 174, and a DTE interface 176 coupled to a DTE 178. Processor 156 is coupled to each of the other components. All of the components in radio 152, except for the computer routines 162, 164, 168, are of standard construction and are commercially available. Preferably, the radio 152 communicates with the base 154 on a single RF channel having a forward channel 180 and a reverse channel 182.

In operation, the radio 152 constantly monitors the reverse channel 182 for transmissions from the base 154. When a time assignment frame arrives from the base 154, the information from the assignment frame is received by receiver 170, routed to processor 156, and stored within data storage 168. Thereafter, processor 156 executes the determining routine 162 to ascertain whether an information time slot has been reserved for the radio 152. To do so, the determining routine 162 performs steps 71 and 72 of FIG. 4. Specifically, routine 162 searches the radio specific sections 48 of the assignment frame 49 (FIG. 5) for a section which contains the identification code of the radio 152 in field 62. Routine 162 then looks in field 66 for a non-zero value. Only if field 66 contains a non-zero value has an information time slot been reserved for radio 152.

Where an information time slot has been reserved, the processor 156 executes the control routine 166 to transmit an information frame to the base 154. Routine 166 loads the data to be transmitted from DTE 178, through interface 176, into the processor 156. The routine 166 then determines whether DTE 178 has another set of data ready to transmit. If so, routine 166 ascertains how many octets will be needed to transmit the data. Routine 166 thereafter forms an information frame such as that shown in FIG. 6, placing the data to be transmitted into field 86 and placing the number of octets needed, if any, to transmit the next set of data into field 88. The information is thus ready for transmission. To transmit the information frame, routine 166 computes the real time at which it should begin transmission. The manner in which this start time is computed was described previously in connection with step 74 of FIG. 4 and need not be repeated here. Once computed, the start time is loaded into real time clock 174. When the start time is reached, clock 174 sends an interrupt signal to processor 156 and, in response, the control routine 166 sends the information frame to the transmitter 172 and causes the transmitter 172 to send the information frame on the forward channel 180 to the base 154.

Where an information time slot has not been reserved, the radio 152 requests permission to send an information frame. To do so, the processor 152 executes the selecting routine 164. Routine 164 begins by ascertaining from DTE 178 how much data, in octets, the DTE 178 has to send. Armed with this information, routine 164 forms a request frame such as that shown in FIG. 7, placing the length of the data in field 100. The request frame is thus ready to send. Before sending the request frame, the selecting routine 164 first selects a request time slot during which to send the request. Routine 164 selects a time slot by looking at field 54 of the assignment frame 49 to determine how many requests slots have been announced for the upcoming period. Routine 164 then preferably randomly selects a number from one to and including the number of request time slots announced to choose one of the request time slots. After the request slot is selected, processor 156 executes control routine 166 to send the request frame.

To send the request frame, routine 166 first computes the real time at which to start the transmission. This computation was described previously with respect to step 92 of FIG. 4 and need not be repeated here. With the start time computed, the routine 166 loads the start time into clock 174. The clock 174 interrupts the processor 156 when the start time is reached and the control routine responds by sending the request frame to the transmitter 172 and causing the transmitter 172 to send the request frame to base 154. Radio 152 thus implements the first sub-method of the present invention. As described, radio 152 implements the first sub-method of the invention by having the processor 156 execute several program routines 164–166. It should be noted, however, that the functions performed by the program routines may be performed instead by specialized circuits, and this modification is within the scope of the present invention.

The base station 154 shown in FIG. 10 will now be described. Base 154 preferably comprises a processor 184, a working memory 186 wherein a plurality of program routines 188–196 are stored, a data storage 198, receiver 200, transmitter 202, and real-time clock 204. Processor 184 is coupled to each of the other components, and all of the components in base 154, except for the program routines 188–196 are of standard construction and are commercially available.

In operation, the processor 184 begins by executing the designating routine 188. Routine 188 designates the number of acknowledgement time slots and request time slots there will be in the upcoming period. The number of acknowledgement slots is determined by ascertaining how many radios need to acknowledge the receipt of information from the base 154, and the number of request slots is determined based on the amount of traffic currently on the forward channel 180. It has been found that six request slots are adequate for normal operation, but if traffic is heavy, more request slots may be designated.

After running routine 188, the processor 184 executes the control routine 190 to form and to transmit an assignment frame such as that shown in FIG. 5. Control routine 190 obtains from the designating routine 188 the number of acknowledgement and request slots there will be in the upcoming period, and puts this information into fields 56 and 54, respectively, of the assignment frame 49. Control routine 190 then forms zero or more radio specific sections 48 to either acknowledge the receipt of information from a particular radio or to reserve an information time slot for a particular radio. Control routine 190 obtains reserved time slot information from the scheduling routine 194 (described in a subsequent section) and forms the radio specific sections 48. Specifically, control routine 190 places tile target radio's identification code in field 62 and the number of octets reserved in field 66. After placing all of the other necessary information into the proper fields to form a complete time assignment frame 49 as shown in FIG. 5, control routine 190 sends the assignment frame to transmitter 202 and causes the transmitter 202 to transmit the frame on the reverse channel.

After the assignment frame is sent, control routine 190 causes receiver 200 to receive acknowledgement, information, and request frames during the proper time slots. Since routine 190 formed the assignment frame, it knows the number and length of all of the time slots. Thus, control routine 190 knows when each time slot begins and ends so that, by using the real-time clock 204, the control routine 190 can control the receiver 200 to cause it to receive the proper frames at the proper times. All of the information received by receiver 200 is routed through processor 184 and stored within data storage 198.

Thereafter, processor 184 runs the determining routine 192. This routine 192 checks the portions of data storage 198 containing the information received during the request time slots to determine for each request time slot whether a request frame was successfully received. The process for determining whether a request was successfully received was described previously in connection with steps 110–114 of FIG. 8 and need not be repeated here. For each request frame that was received successfully, determining routine 190 extracts from field 98 of the request frame the identification code of the radio sending the request. By doing this, routine 190 is in effect designating each radio sending a successful request as a sending radio.

For each sending radio, processor 184 executes the scheduling routine 194. Routine 194 determines whether to assign a reserved information time slot to the sending radio in the next period or to defer assignment until a later period. This determination is based on the priority of the particular sending radio and the channel traffic. Preferably, routine 194 has access to a priority table so that it knows the priority of the sending radio. Since routine 194 assigns information time slots to selected radios, it knows if channel traffic is heavy. If routine 194 decides to reserve an information time slot for the radio in the next period, it extracts from field 100 of the request frame sent by the radio the number of octets requested, and reserves an information time slot which is of sufficient length to allow the specified number of octets of data to be transmitted. If assignment is deferred, routine 194 reserves zero octets for the sending radio.

After the scheduling routine 194 is executed, the processor runs the chaining routine 196 to determine whether any of the radios sending information frames are trying to frame chain. Routine 196 looks in the portions of data storage 198 containing the information frames received and checks field 88 of each information frame to determine if the radios are requesting to send another information frame. If field 88 contains a non-zero value, the radio is requesting to send another information frame. Thus, routine 196 causes the scheduling routine 194 to run for the requesting radio. It should be noted that the scheduling routine 194 may reserve for the requesting radio an information time slot in the next period, or it may choose to defer reservation until another subsequent period. Chaining does not guarantee that an information slot will be reserved in the very next period. After running the chaining routine 196, processor 184 again executes the designating routine 188 and the control routine 190 to send out another time assignment frame, and the entire process described above is repeated. Base 154 has been described as implementing the second sub-method of the present invention by having the processor 184 execute routines 188–196. It should be noted, however, that specialized circuits may be used instead of the routines 188–196 to perform the same functions. This modification is within the scope of the invention.

Figure 11:
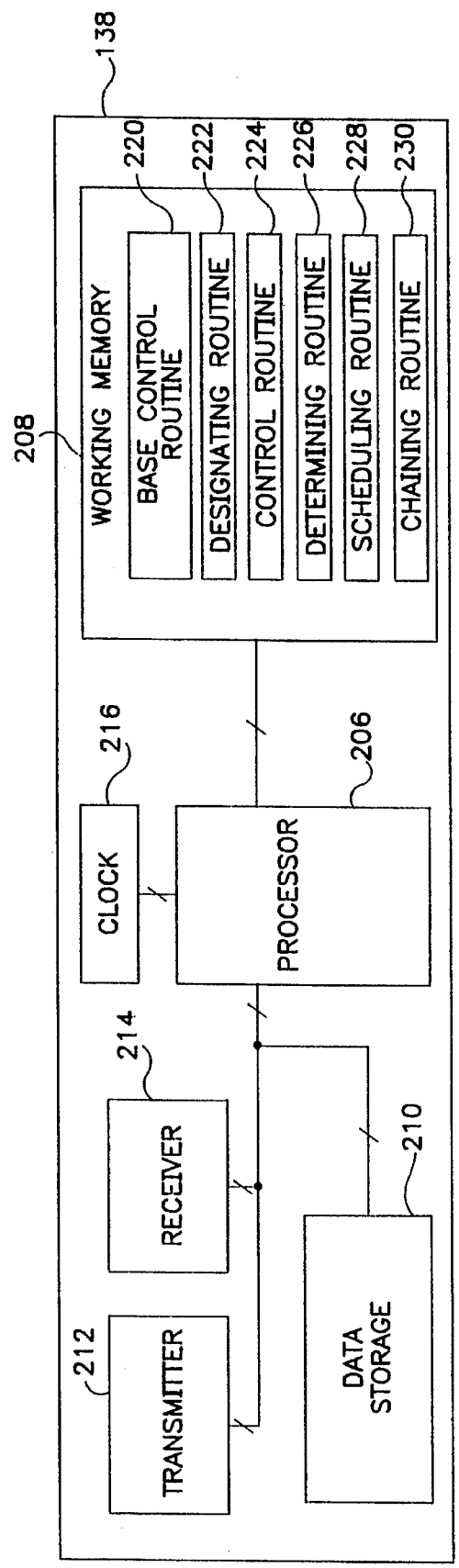
FIG. 11 is a detailed block diagram of a central hub for implementing the method of the present invention.

FIG. 10 shows a communication system wherein the base station 154 performs the second sub-method of the present invention. However, in a MAN network such as that shown in FIG. 9, it is the hub 138 which implements the second sub-method. Hub 138 is shown in greater detail in FIG. 11. Note that hub 138 comprises substantially the same components as base 154 in FIG. 10. This is as expected since the hub 138 performs substantially the same functions as the base 154. The only difference is that hub 138 has a base control program routine 220 stored within working memory 208 to allow it to control the intermediate base stations 136 (FIG. 9). In substantially all other relevant aspects, hub 138 is identical to the base 154. Again, specialized circuits may be used in place of the routines 220–230 to perform the same functions as the routines.

What is claimed is:

1. In a communications system comprising a base station which controls access to a communications channel and which divides time on said channel into periods, each said period comprising an assignment frame of plural request time slots and plural information time slots, a method for coordinating the transfer of information signals to said base station, comprising the steps of:

transmitting a request time slot assignment frame to a plurality of sending sources, each of the request time slots in the assignment frame designating a time during which corresponding ones of the sending sources may request to transfer information signals;

receiving a request signal from a sending source on said channel during a designated request time slot;

identifying a sending source which sent the received request signal;

ascertaining a priority associated with said sending source; and determining, based on the priority of said sending source, whether to reserve one or more information time slots on said channel for said sending source to send information signals.

2. The method of claim 1, further comprising the step of:

in response to a determination that an information time slot should not be reserved for said sending source, deferring reserving an information time slot for said sending source until a subsequent period.

3. The method of claim 2, wherein the step of deferring comprises the steps of:

acknowledging to said sending source the receipt of the request signal from said sending source; and informing said sending source that no information time slot has yet been reserved.

4. The method of claim 1, further comprising the steps of:

in response to a determination that an information time slot should be reserved for said sending source, reserving an information time slot on said channel in an upcoming period; and receiving information signals from said sending source during the reserved information time slot.

5. The method of claim 4, wherein the request signals and the information signals are packaged in frame format.

6. The method of claim 4, further comprising the steps of:

determining whether request signals are included in said information signals; and in response to a determination that request signals are included in said information signals, reserving a second information time slot on said channel in a second upcoming period for said sending source.

7. The method of claim 1, further comprising the steps of:

in response to a determination that an information time slot should be reserved for said sending source, extracting from the request signal from said sending source a length of time needed to transmit information signals;

reserving an information time slot on said channel in an upcoming period having a length generally equal to the length of time needed for said sending source to transmit said information signals; and receiving said information signals from said sending source during the reserved information time slot.

8. In a communications system comprising a base station which controls access to a communications channel, a method for coordinating the transfer of information signals to said base, comprising the steps of:

receiving request signals on said channel;

for at least one of the request signals which was received, identifying a sending source which sent the received request signal;

reserving an information time slot on said channel for said sending source;

receiving information signals from said sending source during the reserved information time slot;

determining whether a request signal is included in said information signals for requesting permission to send additional information signals;

in response to a determination that a request signal is included in said information signals, determining whether said sending source requires that the additional information signals be sent before a specified time interval has elapsed since said information signals were sent; and in response to a determination that the additional information signals need to be sent before the specified time interval has elapsed, reserving an additional information time slot on said channel for said sending source, said additional information time slot beginning before said specified time interval has elapsed.

9. In a communications system comprising a base station and a central hub for controlling the base station, said central hub controlling access to a communications channel and dividing time on said channel into periods, each said period comprising an assignment frame of plural request time slots and plural information time slots, a method for coordinating the transfer of information signals to said base, comprising the steps of:

transmitting a request time slot assignment frame to a plurality of sending sources, each of the request time slots in the assignment frame designating a time during which corresponding ones of the sending sources may request to transfer information signals on said channel;

the base receiving request signals on said channel during designated request time slots;

for at least one of the request signals which was received, the hub identifying a sending source which sent the received request signal;

the hub ascertaining a priority associated with said sending source; and the hub determining, based on the priority of said sending source, whether to reserve one or more information time slots on said channel for said sending source to send information signals.

10. The method of claim 9, further comprising the steps of:

in response to a determination that an information time slot should not be reserved for said sending source, the hub acknowledging to said sending source the receipt of a request signal from said sending source; and the hub informing said sending source that no information time slot has yet been reserved.

11. The method of claim 9, further comprising the steps of:

in response to a determination that an information time slot should be reserved for said sending source, the hub reserving an information time slot on said channel in an upcoming period; and the base receiving information signals from said sending source during the reserved information time slot.

12. The method of claim 11, further comprising the steps of:

the hub determining whether a request signal is included in said information signals; and in response to a determination that a request signal is included in said information signals, the hub reserving a second information time slot on said channel in a second upcoming period for said sending source.

13. The method of claim 9, further comprising the steps of:

in response to a determination that an information time slot should be reserved for said sending source, the hub extracting from the request signal from said sending source a length of time needed to transmit information signals.

the hub reserving an information time slot on said channel in an upcoming period having a length generally equal to the length of time needed for said sending source to transmit said information signals; and the base receiving said information signals from said sending source during the reserved information time slot.

14. In a communications system comprising a base station and a central hub, said central hub controlling access to a communications channel, a method for coordinating the transfer of information signals to said base, comprising the steps of:

the base receiving request signals on said channel;

for at least one of the request signals which was received, the hub identifying a sending source which sent the received request signal;

the hub reserving an information time slot on said channel for said sending source;

the base receiving information signals from said sending source during the reserved information time slot;

the hub determining whether a request signal is included in said information signals for requesting permission to send additional information signals;

in response to a determination that a request signal is included in said information signals, the hub determining whether said sending source requires that the additional information signals be sent before a specified time interval has elapsed since said information signals were sent; and in response to a determination that the additional information signals need to be sent before the specified time interval has elapsed, the hub reserving a additional information time slot on said channel for said sending source, said additional information time slot beginning before said specified time interval has elapsed.

15. In a communications system comprising a plurality of radios and a base station wherein said radios send signals to said base station via a communications channel and wherein the time on said channel is divided into periods having plural request time slots and plural information time slots, a base station for use in said system, comprising:

transmitting means for transmitting in an assignment frame a designation of plural selected time slots on said channel as request time slots;

a receiver for receiving signals on said channel;

control means for causing said receiver to receive request signals on said channel during said request time slots;

determining means for determining whether any request signals were successfully received during said request time slots, said determining means designating each radio sending a successfully received request signal as a sending radio; and a scheduling means for selectively reserving information time slots on said channel, said scheduling means ascertaining, for at least one of said sending radios, a priority associated with said one sending radio, and determining based on said priority whether to reserve for said one sending radio an information time slot on said channel.

16. The base station of claim 15, wherein said scheduling means, in response to a determination that an information time slot should be reserved for said one sending radio, extracts from the request signal sent by said one sending radio a length of time needed to send information signals, and reserves for said one sending radio an information time slot on said channel having a length generally equal to the length of time needed to send said information signals.

17. The base station of claim 16, wherein said control means causes said receiver to receive said information signals during the reserved information time slot, and wherein said base station further comprises:

chaining means for determining from said information signals whether request signals are included in said information signals.

18. The base station of claim 15, wherein said scheduling means, in response to a determination that an information time slot should not be reserved for said one sending radio, reserves an information time slot having a length of zero for said one sending radio to acknowledge receipt of the request signal from said one sending radio, and to inform said one sending radio that an information time slot has not yet been reserved.

19. In a communications system comprising a plurality of radios and a base station wherein said radios send signals to said base via a communications channel and wherein the time on said channel is divided into periods having plural request time slots and plural information time slots, a central hub for use in said system for controlling said base station, comprising:

transmitting means for transmitting in an assignment frame a designation of plural request time slots on said channel;

control means for causing said base to receive request signals on said channel during said request time slots;

determining means for determining whether any request signals were successfully received by said base during said request time slots, said determining means designating each radio sending a successfully received request signal as a sending radio; and a scheduling means for selectively reserving information time slots on said channel, said scheduling means ascertaining, for at least one of said sending radios, a priority associated with said one sending radio, and determining based on said priority whether to reserve for said one sending radio an information time slot on said channel.

20. The central hub of claim 19, wherein said scheduling means, in response to a determination that an information time slot should be reserved for said one sending radio, extracts from the request signal sent by said one sending radio a length of time needed to send information signals, and reserves for said one sending radio an information time slot on said channel having a length generally equal to the length of time needed to send said information signals.

21. The central hub of claim 20, wherein said control means causes said base to receive said information signals during the reserved information time slot, and wherein said central hub further comprises:

chaining means for determining from said information signals whether request signals are included in said information signals.

22. The central hub of claim 19, wherein said scheduling means, in response to a determination that an information time slot should not be reserved for said one sending radio, acknowledges receipt of the request signal from said one sending radio, and informs said one sending radio that an information time slot has not yet been reserved.

23. A communications system for sending information signals on a communications channel, the time on said channel being divided into periods with each said period comprising plural information time slots during which information signals may be received, comprising:

a plurality of radios for sending signals on a communications channel; and a base station for coordinating the sending of said signals on said channel, said base station comprising:

designating means for designating in an assignment frame plural selected time slots on said channel as request time slots;

a receiver;

control means for causing said receiver to receive request signals from said radios on said channel during said request time slots;

determining means for determining whether any request signals were successfully received during said request time slots, said determining means designating each radio sending a successfully received request signal as a sending radio; and a scheduling means for selectively reserving information time slots on said channel, said scheduling means ascertaining, for at least one of said sending radios, a priority associated with said one sending radio, and determining based on said priority whether to reserve for said one sending radio an information time slot on said channel.

24. A communications system for sending information signals on a communications channel, the time on said channel being divided into periods with each said period comprising plural information time slots during which information signals may be received, comprising:

a plurality of radios for sending signals on a communications channel;

at least one base station for receiving said signals from said radios on said channel; and a central hub for controlling said base station, said central hub comprising:

designating means for designating in an assignment frame plural selected time slots on said channel as request time slots;

control means for causing said base to receive request signals from said radios on said channel during said request time slots;

determining means for determining whether any request signals were successfully received by said base during said request time slots, said determining means designating each radio sending a successfully received request signal as a sending radio; and a scheduling means for selectively reserving information time slots on said channel, said scheduling means ascertaining, for at least one of said sending radios, a priority associated with said one sending radio, and determining based on said priority whether to reserve for said one sending radio an information time slot on said channel.

* * * * *